Patented Aug. 6, 1935

2,010,726

UNITED STATES PATENT OFFICE 2,010,726

PROCESS FOR THE PREPARATION OF HIGH MOLECULAR ETHERS

Alfred Kirstahler, Dusseldorf, Germany, assignor to firm Henkel & Cie., G. m. b. H., Dusseldorf, Germany No Drawing. Application November 29, 1932, Serial No. 644,916. In Germany December 29, 1931

15 Claims. (Cl. 260—151)

I have found that a new class of valuable organic substances can be obtained if saturated or unsaturated aliphatic alcohols having more than 8 carbon atoms in the molecule are caused to react with 1-2-propylene oxides which are substituted in the methyl residue by reactive groups. Oxygen ethers are thereby formed.

The higher fatty alcohols and alcohols from paraffins may be employed as compounds containing hydroxy groups. Of course, the said starting materials may in their turn be substituted by various groups, provided the latter do not take part in the reaction. Polyvalent alcohols may also be subjected to the reaction, provided their molecule contains more than 8 carbon atoms.

Ephichlorhydrin, epibromhydrin, epihydrin alcohol (glycide), thioglycide and many others may be employed for example as 1-2-propylene oxides which are substituted in the methyl residue by reactive groups. If desired the reactions may also be carried out in the presence of reaction accelerating agents, such, for example, as concentrated sulphuric acid.

The new compounds may inter alia be employed as softening agents. Furthermore they may serve as starting materials for the manufacture of other technically important products.

Examples 1. 372 parts by weight of dodecanol-1 are mixed with 92 parts by weight of epichlorydrin, and after the addition of about 10 parts by volume of concentrated sulphuric acid, are heated for several hours on the water bath. In order to remove the sulphuric acid, an excess of dry barium carbonate is added and the mixture is filtered. A good yield of the new ether compound ($\gamma$-chlor-$\beta$-oxy-propyl-) dodecylether can be recovered from the filtrate by distillation in a vacuum. It boils at 193–195° C. under 13.5 millimetre pressure and forms a colourless oil.

I claim:

1. A process for the preparation of high molecular ethers which comprises mixing an aliphatic alcohol having more than 8 carbon atoms in the molecule with a 1-2-propylene oxide containing in the methyl residue a reactive group which does not react with the alcohol.

2. A process for the preparation of high molecular ethers which comprises mixing an unsaturated aliphatic alcohol having more than 8 carbon atoms in the molecule with a 1-2-propylene oxide containing in the methyl residue a reactive group which does not react with the alcohol.

3. A process for the preparation of high molecular ethers which comprises mixing an aliphatic divalent alcohol having more than 8 carbon atoms in the molecule, with a 1-2-propylene oxide containing in the methyl residue a reactive group which does not react with the divalent alcohol.

4. A process for the preparation of high molecular ethers which comprises mixing an unsaturated aliphatic divalent alcohol having more than 8 carbon atoms in the molecule with a 1-2-propylene oxide containing in the methyl residue a reactive group which does not react with the divalent alcohol.

5. A process for the preparation of high molecular ethers which comprises mixing a 1-2-propylene oxide with an aliphatic alcohol having more than 8 carbon atoms in the molecule and containing substituent groups which do not take part in the reaction.

6. A process for the preparation of high molecular ethers which comprises mixing an aliphatic alcohol having more than 8 carbon atoms in the molecule with epichlorhydrin.

7. A process for the preparation of high molecular ethers which comprises mixing an aliphatic alcohol having more than 8 carbon atoms in the molecule with epihydrin alcohol.

8. A process for the preparation of high molecular ethers which comprises reacting a fatty alcohol containing more than 8 carbon atoms with epichlorhydrin in the presence of sulphuric acid.

9. A process for the preparation of a high molecular ether, which comprises mixing dodecanol with epichlorhydrin.

10. A process for the preparation of a high molecular ether, which comprises reacting dodecanol with epichlorhydrin in the presence of sulphuric acid.

11. A composition of matter consisting of high molecular aliphatic ethers which may be represented by the general formula

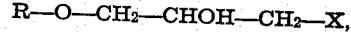

in which R represents an alkyl radical containing more than 8 carbon atoms and X represents a reactive group selected from a halogen group and a hydroxy group.

12. A composition of matter consisting of high molecular aliphatic ethers which may be represented by the general formula

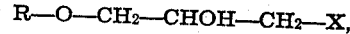

in which R represents an unsaturated alkyl radical containing more than 8 carbon atoms and X represents a reactive group selected from a halogen group and a hydroxy group.

13. A composition of matter consisting of high molecular aliphatic ethers which may be represented by the general formula $$R\text{—}O\text{—}CH_2\text{—}CHOH\text{—}CH_2\text{—}X,$$

in which R represents a substituted alkyl radical containing more than 8 carbon atoms and X represents a reactive group selected from a halogen group and a hydroxy group.

14. A composition of matter consisting of high molecular aliphatic ethers which may be represented by the general formula $$R\text{—}O\text{—}CH_2\text{—}CHOH\text{—}CH_2\text{—}Cl,$$

in which R represents an alkyl radical containing more than 8 carbon atoms.

15. A new product of manufacture consisting of the (γ-chlor-β-oxy-propyl) dodecyl ether.

ALFRED KIRSTAHLER.